(No Model.)
J. S. HALL.
FEED LUBRICATOR.
No. 322,927. Patented July 28, 1885.
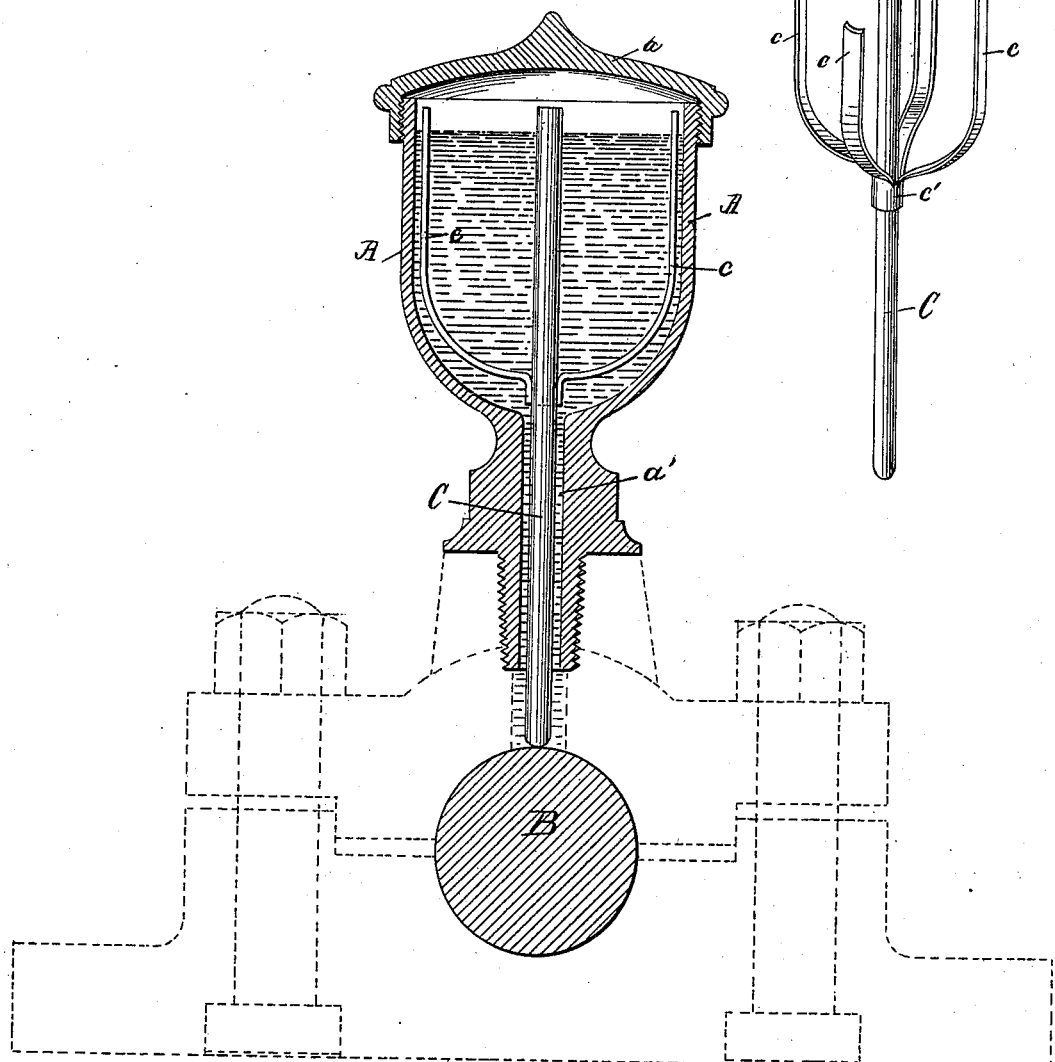
Witnesses:
A. S. Fitch
[signature]
Inventor
John S. Hall
By J. P. Fitch
His Atty.

UNITED STATES PATENT OFFICE.

JOHN S. HALL, OF NEW YORK, N. Y.

FEED-LUBRICATOR.

SPECIFICATION forming part of Letters Patent No. 322,927, dated July 28, 1885.

Application filed June 16, 1885. (No model.)

*To all whom it may concern:*

Be it known that I, JOHN S. HALL, of the city, county, and State of New York, have invented an Improved Feed-Lubricator for Journal-Bearings, &c., of which the following is a full, clear, and exact description, reference being had to the accompanying drawings, forming part of this specification, in which—

Figure 1 is a vertical central sectional view of a feed-lubricator containing my invention, and showing the journal and bearing to which the same is attached; and Fig. 2 is a perspective side view in detail of the device embodying my improvement in its preferable form.

My invention consists in a feed-lubricator composed of a cup or reservoir for containing the grease or lubricant, and a channel or communication leading therefrom to the bearing to be lubricated, together with a stem or needle extending longitudinally of said channel from the journal, upon which its lower or outward extremity impinges, to and into the cup or reservoir where its upper or inward extremity is provided with radial arms or projections within the cup, as hereinafter described, and for the purpose hereinafter set forth.

A is the cup or reservoir, in which is placed the lubricant-grease. This cup has the usual cap or cover, *a*. A channel or communication, *a'*, extends from the cup to the journal B in the bearing, the usual box being shown in dotted lines in Fig. 1, with the lubricator attached to the bearing in the ordinary way by screwing it into a channeled seat in the cap of the box.

A stem or needle, C, extends longitudinally of the channel *a'*, and is of such a diameter that it will move easily in said channel, and will leave a space about it between its face and the wall of the channel, as shown in Fig. 1. The passage of the lubricant from the cup along said channel to the journal is thus provided for. The outward or lower extremity of the stem C projects to and impinges upon the journal, as shown. The upper or inward end of the stem, within the cup, is provided with radial arms or projections of a greater or less length, and of any desired form or dimensions. I find it preferable to construct the stem and arms in the form shown in Fig. 2—namely, to continue or extend the stem upward of the cup to near its rim-line, and to have the radial arms in the form of branches *c*, carried by a sleeve, *c'*, which fits snugly on the stem, and yet is capable of adjustment longitudinally thereon. This may be economically effected by taking a piece of metal tubing of suitable length, and which will fit upon the stem, as described, and cutting the said tube lengthwise from its top to near its bottom, and then spreading out the split portions radially, as shown. I also find it preferable to give to the radial arms such direction and form that they will extend nearly to the interior face of the cup, and will conform to the outline thereof, as shown in Fig. 1. Any desired number of these arms or branches may be employed, and they may be formed of separate pieces attached to the stem, or may be in one and the same piece as the stem, and also may be in the form of irregular projections on the stem extending across the cup in any direction.

The object of my invention is to facilitate the melting and rendering sufficiently fluid the lubricant employed to enable its constant flow to the journal to be secured. As the lubricants generally employed in oilers of this description are placed in the cup in a more or less solid or semi-solid state, the rendering of them fluid so that they will pass readily and in a constant even flow to the journal is important.

In the operation of my invention the heat generated by the journal in its revolutions in the bearing is transmitted along the stem C, and thence to and along the branches or projections *c*, and so is communicated to the lubricant in the cup, and consequently liquefies it so that it will run easily and constantly through the channel *a'* around the stem to the journal. Furthermore, the vibrations of the journal will cause the stem in contact with it to vibrate, and this produces a tendency in the stem to rotate, thus causing the branches or projections thereof to be carried around and through the melting lubricant in the cup, agitating the same and assisting in producing the desired constant and effective flow of the lubricant to the journal.

What I claim as my invention, and desire to secure by Letters Patent, is—

1. In a feed-lubricator, the combination, with the cup or reservoir for holding the lubricant and the channel for conducting the same to the journal-bearing, of a needle or stem extending loosely longitudinally of said channel, and with its outward extremity adapted to impinge upon said journal, and provided with arms or projections extended transversely of the said cup within the same, as and for the purpose set forth.

2. In a feed-lubricator, the combination, with the cup or reservoir for holding the lubricant and the channel for conducting the same to the journal-bearing, of a needle or stem extending loosely longitudinally of said channel, and with its outward extremity adapted to impinge upon said journal, and provided with arms extending radially and in conformity with the outline of the interior of the said cup from a sleeve fitted on said needle or stem within the said cup, as and for the purpose set forth.

J. S. HALL.

Witnesses:
A. G. N. VERMILYA,
HENRY EICHLING.